United States Patent Office

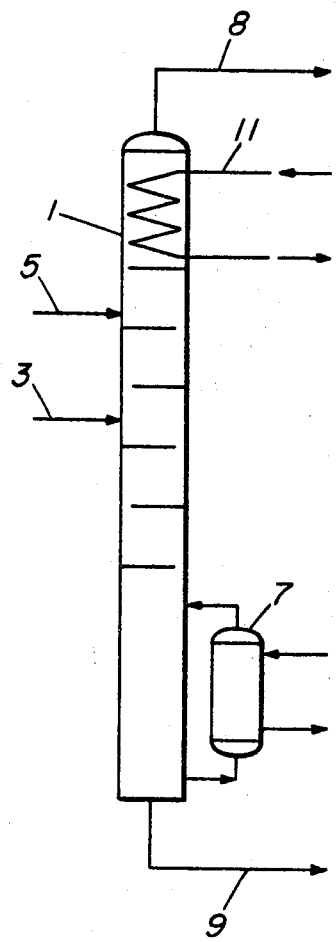
INVENTORS:
ALEXANDER F. MACLEAN
CHARLES C. HOBBS
BY: *Ralph M. Pritchett*
AGENT

3,398,185
Patented Aug. 20, 1968

3,398,185
SEPARATION OF FORMALDEHYDE FROM HYDROGEN PEROXIDE BY EXTRACTIVE DISTILLATION AND SUBSEQUENT FORMATION OF PERACETIC ACID
Alexander F. MacLean and Charles C. Hobbs, Corpus Christi, Tex., assignors to Celanese Corporation, New York, N.Y., a corporation of Delaware
Filed Aug. 12, 1966, Ser. No. 571,975
9 Claims. (Cl. 260—502)

ABSTRACT OF THE DISCLOSURE

A gaseous mixture comprising formaldehyde, an olefin, and hydrogen peroxide, such as obtainable by vapor-phase hydrocarbon oxidation and therefore typically containing some of the unreacted hydrocarbon, is resolved into a vapor comprising the olefin and formaldehyde and a liquid comprising a solution of hydrogen peroxide by subjecting the gaseous mixture to an extractive distillation in a column into the upper portion of which there is injected a suitable extractant which as a solvent for hydrogen peroxide. Acetic acid is a particularly suitable extractant. The olefin, formaldehyde, and unrected hydrocarbon are withdrawn as gases from the head of the column, and the hydrogen peroxide dissolved in the extractant is withdrawn from the base. The invention comprises both a separation technique and a method for recovering hydrogen peroxide from hydrocarbon oxidation processes. When the extractant is acetic acid, the resulting solution of hydrogen peroxide can also be readily converted to peracetic acid.

---

This invention relates to the separation of formaldehyde from hydrogen peroxide. More particularly it relates to an extractive distillation method for the resolution of a gaseous mixture comprising hydrogen peroxide, an olefinic hydrocarbon, and formaldehyde into a fraction comprising hydrogen peroxide and a fraction comprising the olefin and the formaldehyde.

Additionally, this invention relates to a method for recovering a fraction comprising hydrogen peroxide and a second fraction comprising formaldehyde and an olefinic hydrocarbon from a gaseous reaction product formed by the vapor phase oxidation of a hydrocarbon. In one specific embodiment the hydrogen peroxide is converted to, and recovered in the form of, peracetic acid.

The partial oxidation of hydrocarbons, especially butane and propane, in the vapor phase with molecular oxygen to produce organic chemicals is known and is the basis for a substantial segment of the organic chemical industry. The technology, with the details of which this invention is not concerned, is quite complicated. Briefly, however, at relatively high pressures and relatively low temperatures, i.e. above about 6 atmospheres and below a reaction temperature of about 500° C., the products of the reaction comprise primarily oxygenated derivatives of the hydrocarbon feedstock, such as alcohols, acids, and ketones. At relatively high temperatures and low pressures, i.e. above about 450° C. and at pressures in the range of about 1 to 3 atmospheres, the product consists largely of olefinic hydrocarbons resulting from cracking reactions, formaldehyde, and hydrogen peroxide. It is to be understood that under both sets of reaction conditions the reaction product also contains substantial quantities of unreacted hydrocarbon feedstock along with inert gases such as carbon oxides and, if the source of molecular oxygen is air, nitrogen. It is also to be understood that there is no sharp dividing line between the two types of reaction system. That is, the low-pressure-high temperature system produces some oxygenated derivatives, such as methanol and acetaldehyde, while the high pressure-low temperature system produces some hydrogen peroxide.

The vapor phase oxidation of hydrocarbons to produce hydrogen peroxide among other products is discussed in considerable detail by Satterfield and Wilson in "Industrial and Engineering Chemistry," volume 46, pages 1001–1007 (1954), taking propane as a typical hydrocarbon feed-stock. These workers have demonstrated that, in a straightforward and technologically feasible vapor phase oxidation process, propane can be converted to a reaction product containing substantial quantities of propylene, formaldehyde, and hydrogen peroxide. Serious and heretofore unsolved difficulties exist, however, in separating and recovering these products because of the tendency of the hydrogen peroxide to decompose or react with some of the other components of the reaction product, particularly the formaldehyde. Satterfield, Wilson, Stein, and Cooper in "Industrial and Engineering Chemistry," Volume 46, pages 1007–1010 (1954) considered this problem and studied three methods for recovering the hydrogen peroxide. They were (a) fractional condensation in surface condensers of short residence time, (b) distillation of the condensed product in the presence of methanol, and (c) precipitation of the hydrogen peroxide as calcium peroxide which was then separated with hydrogen peroxide being recovered therefrom. A high peroxide recovery was reported for the last-named method, but the other two methods were found to have serious drawbacks. Fractional condensation resulted in co-condensation of formaldehyde and hydrogen peroxide with resulting inter-reaction, while the distillation method resulted in product loss and was also reported to entail some risk of explosion. Thus, although distillation is a straightforward technique with many practical advantages, the existing art has not been successful in applying it to the separation of hydrogen peroxide from the other products of vapor phase hydrocarbon oxidation. Although hydrogen peroxide is produced in the reaction step in the vapor phase oxidation of hydrocarbons, it is not now being generally recovered from such operations.

It is an object of this invention to provide a method for resolving a gaseous mixture comprising formaldehyde, hydrogen peroxide, and an olefin into a fraction comprising hydrogen peroxide and another fraction comprising formaldehyde and the olefin. It is another object to provide a method for producing an olefin, formaldehyde, and hydrogen peroxide by a process including as its initial step the partial oxidation of a lower hydrocarbon with molecular oxygen in the vapor phase.

It is an additional object to provide a method for conveniently and efficiently producing peracetic acid while carrying out the separation of hydrogen peroxide from the mixture described in the foregoing objects.

In accordance with this invention, as illustrated in the drawing a gaseous mixture comprising formaldahyde, an olefin, and hydrogen peroxide is passed, through an inlet connection 3 at a location intermediate between the base and the top, into a distillation column 1 into which, through an inlet connection 5 located above that through which the gaseous mixture is fed, there is injected a liquid extractant in which hydrogen peroxide has a substantial solubility and with which formaldehyde does not tend to react readily. Reboil heat is supplied, as by reboiler 7, to the base of the column. From the base of the column there is withdrawn through an outlet connection 9 a solution of hydrogen peroxide in the extractant liquid, substantially free of formaldehyde or at any rate containing hydrogen peroxide and formaldehyde in a very high ratio of peroxide to formaldehyde. From the head of the column, as through outlet 8 there is withdrawn a lean gas comprising the olefin, formaldehyde, and other gases, such as methane and nitrogen, which may have been present in the gaseous mixture originally passed into the column. As shown in the drawing the column has an internal condenser or dephlegmator 11, but it will be understood that a condenser, when employed, can be of the external type if desired.

The basis of the invention is the discovery that hydrogen peroxide, having a low volatility, can be efficiently and quickly absorbed into a suitable solvent whereas monomeric formaldehyde, which is the form in which formaldehyde exists in gaseous mixture, is highly volatile and is not readily absorbed in most liquids with which it does not also readily react chemically, particularly when these liquids are comparatively hot. Therefore, passing a gas containing monomeric formaldehyde and other volatiles (e.g. methanol and acetaldehyde), together with hydrogen peroxide and any other materials which are relatively non-volatile, into the midsection of a distillation tower operating as described above results in the separation of the gas mixture into a volatile and a non-volatile fraction. Once this separation has been effected, additional separation and purification operations known to the existing art can be applied to the two fractions for the ultimate recovery and utilization of the individual components therein.

Two factors are basic in the successful application of the invention. These are (a) the choice of the extractant liquid employed in the tower and (b) the operating conditions maintained in the tower.

The extractant should be one in which hydrogen peroxide has a substantial solubility. Specifically, it should be a liquid in which, at about 70° C., hydrogen peroxide has a solubility of at least about 5% and preferably about 20% by weight. It also must be substantially free of components which, at temperatures in the range of 50° C. to 70° C., will react with, or catalyze the decomposition of, hydrogen peroxide. Such components include carbonyl compounds, strong bases, and varivalent metal ions. Advantageously, the liquid should also be one which is less volatile than the olefin contained in the gas passed into the tower but which has a vapor pressure of at least about 50 millimeters of mercury at 70° C. Liquids of lower volatility than this can be employed in conjunction with very high vacuum equipment or by using inert gas stripping in the base of the column, but there are many suitable liquids having volatilities in the range described and these are preferred.

In addition to the criteria described above, which relate to conditions obtaining in the base of the distillation column, there are other criteria relating to the conditions obtaining in the upper portions of the column where the liquid is in contact primarily with volatile materials including the monomeric formaldehyde. First, the liquid should be one which does not readily react chemically with formaldehyde, or which reacts only slowly or to a slight degree. This is for the reason that it is essential to avoid as much as possible the absorption of formaldehyde from the vapor phase into the liquid. While it is desirable to employ a liquid which both meets this requirement and in addition does not dissolve formaldehyde at all, a liquid in which some simple solution of formaldehyde, as distinguished from chemical reaction, occurs can be employed. Of commonly available solvents which fit the requirements described above for conditions in the base of the column, this additional requirement of relative inertness toward formaldehyde means essentially that water and primary and secondary alcohols are not not recommended as extractants. This is for the reason that formaldehyde tends to react with these materials and form compounds (polyglycols in the case of water and hemiacetals in the case of hydroxy compounds) in which the formaldehyde is relatively non-volatile and tends to be dragged down into the base of the column in contact with the hydrogen peroxide.

Many compounds and classes of compounds fulfill the requirements described above for the extractant liquid. Esters and ethers are generally suitable, as are carboxylic acids. Chemically stable acetals are also suitable, e.g. cyclic acetals, if the solution of hydrogen peroxide therein is not to be employed in strongly acidic reaction systems, as in the production of peracetic acid. (This limitation is due to the fact that many acetals are subject to hydrolysis in acidic conditions.) Broadly speaking, any liquid is suitable if it has the volatility characteristics described above, if hydrogen peroxide has a substantial solubility therein, and if the liquid is chemically inert toward hydrogen peroxide. For reasons which will be discussed below, acetic acid is particularly advantageous as the extractant liquid in certain instances.

The foregoing has dealt with the characteristics desired in the liquid employed as extractant in the fractionating column. Remaining to be described is the method in which the column is to be operated in practicing the invention. Briefly, what is desired is that hydrogen peroxide shall be effectively scrubbed out of the gas phase in the rectifying section of the column, that absorption of formaldehyde into the liquid phase shall be held to a minimum, and that such formaldehyde as is absorbed into the liquid phase shall be, to the greatest extent possible, stripped out again by vapors ascending from the lower part of the column before it can descend into the base. To the extent that hydrogen peroxide and dissolved formaldehyde are allowed to remain together in a liquid phase, the purpose of the invention is frustrated in that such commingling leads to the chemical reactions between the two materials the avoidance of which is the purpose of the invention. This means, qualitatively speaking, that the column should be designed for the lowest retention time, of both liquids and vapors, consistent with obtaining an overhead vapor free of hydrogen peroxide and a residue stream comparatively free of formaldehyde. For example, satisfactory results have been obtained by feeding the gaseous mixture being resolved into a 5-tray column at a point located between the second and third trays from the bottom, with a stream of acetic acid being introduced as extractant onto the fourth tray from the bottom and with a second stream, also comprising acetic acid, being introduced onto the top tray from a reflux condenser.

The temperature and pressure to be employed in the fractionating column can be varied within certain limits, depending in large part upon the nature of the reflux liquid. Relatively high column temperatures, short of that at which the peroxygen compounds present tend to decompose, are desired in order to minimize formaldehyde absorption into the liquid phase. It has been found in this connection that at a temperature of 70° C. in the base of the column efficient separation of formaldehyde from hydrogen peroxide is obtained without suffering excessive decompositions of the hydrogen peroxide. Temperatures somewhat higher, up to about 100° C., can be tolerated, but at the risk of some decomposition loss of the hydrogen peroxide. Lower temperatures can be employed, especially with reflux liquids in which the solubility of formaldehyde is low, but, generally speaking, lower temperatures result in increased formaldehyde absorption and reaction with the hydrogen peroxide. If the peracetic acid is present in the column, it is recommended that temperatures therein be held below 70° C.; otherwise the peracetic acid will decompose. Broadly speaking, it is recommended that the fractionating column be operated at temperatures not greater than 100° C. and, for efficient stripping action, at temperatures not greatly below about 50° C. in the reboiler.

With respect to pressure to be maintained in the column, the primary requirement is that it be such that the boiling temperature of the liquid in the base does not exceed about 100° C., and preferably that it does not exceed about 70° C. The lower practicable limit for pressure in the column will be determined by engineering considerations such as the temperature of cooling media available for use in condensing the condensable components of the vapors withdrawn from the top of the column. Typically it will be found advantageous to operate the fractionating column at sub-atmospheric pressure.

The extractant liquid fed to the top of the column, which can comprise a material condensed from the vapors withdrawn from the column if desired, is introduced at a rate which is primarily determined by the solubility of hydrogen peroxide therein. Specifically, the extractant is introduced into the column at a rate which is sufficient to dissolve in it, as it passes down through and out the base of the column, all of the hydrogen peroxide contained in the gas being introduced into the column. Not only should there be enough of the extractant to dissolve all of the hydrogen peroxide at the temperature prevailing in the base of the column, but there should also be enough to keep all the hydrogen peroxide in solution even at the somewhat lower temperatures which will be prevailing in the upper portions of the column. That is, the liquid on the trays of the column should never be allowed to approach saturation conditions with respect to the hydrogen peroxide. The formation of a second liquid phase rich in hydrogen peroxide should be avoided both for considerations of safety and also because such a condition would result in the formation of azeotropic mixtures which in turn would result in the appearance of hydrogen peroxide in the vapors being withdrawn from the top of the column. Although in some solvents higher concentrations can be tolerated, it is recommended that enough extractant be supplied to the column to keep the concentration of hydrogen peroxide in the liquid withdrawn from the base of the column below the limit of its solubility in the liquid or about 35% by weight, whichever concentration is lower.

One embodiment of the invention of particular interest comprises the vapor phase oxidation of either butane or propane, followed by the introduction of the oxidation product gases comprising the feed hydrocarbon, the corresponding olefin, formaldehyde, hydrogen peroxide, inert gases, and by-products such as methanol and acetaldehyde, into a distillation column operated according to the process of the invention with acetic acid being employed as the extractant. In this embodiment the mixture of formaldehyde, olefin, and other materials withdrawn from the top of the column is recovered for use as desired by existing techniques well known to those skilled in the art, while the liquid withdrawn from the base of the column, comprising a solution of hydrogen peroxide in acetic acid, is brought into contact with an acidic catalyst in the presence of which the hydrogen peroxide and the acetic acid react to form peracetic acid. The resulting solution of peracetic acid can then be employed as an epoxidizing agent, either as formed or after a preliminary purification step in which it is separated from high-boiling impurities by distillation. This peracetic acid can be employed for any epoxidation reaction for which peracetic acid is normally suitable, but an application of particular economic interest is its utilization to epoxidize the olefin contained in the lean gases recovered from the top of the fractionating column. For example, in an embodiment in which the olefin comprises propylene or butylene, it can be epoxidized with the peracetic acid to form propylene oxide or butylene oxide, the by-product acetic acid resulting from the epoxidation reaction then being recycled as extractant liquid to the fractionating tower. A process thus results whereby, utilizing a hydrocarbon and an oxygen-containing gas such as air as the primary raw materials, an epoxy derivative of the hydrocarbon is manufactured. This is of particular interest in the case of alkylene oxides having more than two carbon atoms, since, unlike ethylene oxide, they cannot be produced directly and economically by the simple vapor-phase oxidation of the corresponding olefin.

The invention is adaptable to the production of an olefin and hydrogen peroxide from many hydrocarbons, but, as a practical matter, it is most adapted to the processing of propane and butane, particularly propane. This is for the reason that higher hydrocarbons, upon being subjected to partial oxidation, tend to form a large number of by-products the presence of which complicates the operation of the fractionating tower which is the basis of this invention. This is particularly the case with higher-boiling by-products, which tend to contaminate the hydrogen peroxide. Ethane can be employed in the process, to produce ethylene and hydrogen peroxide, but the production of hydrogen peroxide per mole of hydrocarbon consumed is much higher in the case of propane as compared with ethane.

As has been indicated previously, the oxidation of a hydrocarbon to produce formaldehyde, hydrogen peroxide, and an olefin derived from the hydrocarbon is already known in the art, and many variations of this oxidation process can be employed to produce the gaseous mixture the resolution of which is the basis of the invention. Typically, the oxidation step is conducted at a controlled temperature in the range of approximately 425° C. to 500° C. and at pressures of about 7 atmospheres or less. Pressures of about 3 atmospheres or less are particularly recommended. Reaction time is typically in the range of 2 to 4 seconds, in a continuous reactor of a type in which back-mixing, that is mixing of the reaction product with fresh reactants, is minimized. Feedstock fed to the reactor typically comprises a mixture of the hydrocarbon and molecluar oxygen containing about 12 to 15 volume percent oxygen. These are reaction conditions which have been found to give a high yield of hydrogen peroxide, but many variations are possible and are known in the art.

The following examples are given to illustrate the invention further.

Example I

Oxygen and vaporized propane were preheated separately, each to about 400–450° C., and introduced into one end of a reactor consisting of a glass cylinder approximately 15 centimeters long and 2.8 centimeters in inside diameter. The oxygen and the propane were mixed immediately upon entering one end of the cylinder by means of sparging the oxygen into the propane through eight small holes immediately inside the inlet end of the reactor and oriented transversely to the longitudinal axis of the cylinder. An outlet connection for reaction product gases was provided at the other end of the cylinder, that is the end opposite the inlet end. A thermowell was provided in the reactor, in a position coinciding approximately with the longitudinal axis of the reactor. The reactor was wrapped with electrical heating elements for temperature control. (In large-scale operations, cooling is required, but in this small reaction system heating was necessary to compensate for heat losses to the surroundings.) Means for controlling the flow rates of propane and oxygen were provided, together with means for sampling the product gas including specifically an oxygen analyzer.

The procedure employed in starting up the reactor was to establish a flow of propane first, then introduce the oxygen carefully while controlling the reactor temperature and observing the oxygen content of the product gas. With feedstock flow rates being set, reaction control was maintained by adjusting reactor temperature to achieve and hold a predetermined oxygen concentration in the reactor product. The reactor product was passed through a condenser after which uncondensed gases were metered and vented. Provision was made for sampling the vent gas as well as for determining oxygen content of the gas entering the condenser. The condensate was diluted with water as collected in order to minimize decomposition and facilitate complete recovery.

To the reactor as described above there were fed continuously 26.4 millimoles per minute of propane vapor and 3.79 millimoles per minute of oxygen, with the oxygen content of the reactor effluent gas being controlled at about 3.9 to 4.5 volume percent by maintaining the temperature in the reactor at approximately 468 to 471° C. Measurement and analysis of the condensed product and the vent gases indicated that approximately 7 percent of the propane and 62 percent of the oxygen had undergone chemical reaction. Of the propane converted approximately 64 percent was converted to propylene, 13 percent to ethylene, 6 percent to carbon oxides, 2 percent to formaldehyde, and 4 percent to oxygenated 3-carbon atom compounds. About 10 percent of the propane was estimated to have been converted to unidentified liquid products, largely methanol. Hydrogen peroxide was also produced, at the rate of 0.2 part by weight of hydrogen peroxide per part of propane consumed. Per part by weight of oxygen consumed, 0.23 part of hydrogen peroxide was produced.

Example II

The product outlet of the reactor described in Example I was connected, through a simple throttling value, to a point midway between the second plate from the bottom and the third plate from the bottom of a five-plate laboratory distillation column 31 millimeters in diameter. The column was equipped with a thermosiphon reboiler and with a reflux condenser operating at 10° C. Uncondensed vapors from the condenser passed through a Dry Ice-acetone cold trap, a hydroxylamine scrubber, and finally through a second cold trap. Valves were provided for drawing off condensate and bottoms streams, and provision was made for measuring and analyzing uncondensed gases drawn from the second cold trap through a vacuum pump. The head of the column was connected for two sources of extractant: (a) reflux from the reflux condenser, flowing into the column onto the top plate, and (b) an auxiliary scrubbing liquid which was introduced onto the second plate from the top.

The reaction system was put into operation under the conditions described in Example I, with the reaction product gas being fed directly through the aforementioned throttle valve into the five tray fractionating column just described. By means of the vacuum pump and the throttle valve, the fractionating column was maintained throughout the test at a pressure of approximately 150 millimeters of mercury absolute. Into the head of the column a flow of extractant was provided consisting of 84 milliliters per hour of acetic acid introduced onto the second plate from the top together with approximately 150 milliliters per hour of reflux, largely acetic acid, introduced onto the top plate from the reflux condenser. The reflux rate was estimated visually; it was not metered, but all distillate condensable at 10° C. was returned to the column as reflux. Heat was provided to the reboiler at a rate sufficient to maintain substantial reflux at the head. The temperature was approximately 70° C. in the base of the column. The reactor and fractionating column were operated in this manner for one hour. The product withdrawn from the top of the column contained approximately 0.444 gram of formaldehyde, 2 grams of propyline, and 66 grams of propane. Approximately 0.01 gram of peroxy moiety, calculated as hydrogen peroxide, was present in the overhead product, presumed to be peracetic acid formed in side reactions in the column. The bottoms product withdrawn from the base of the column weighed 63.4 grams and contained 0.74 gram of hydrogen peroxide and 0.03 gram of formaldehyde, the remainder being largely acetic acid containing about 2 percent water. Of the total amount of peroxygen moiety estimated to have been contained in the gases fed to the column, 86 percent was accounted for in the product recovered from the column, and 98.6 percent of this was recovered in the bottom stream. Of the formaldehyde estimated to have been fed to the column 93.9 percent was recovered in the cold traps and in the hydroxylamine scrubber.

Example III

The reaction system described in Example I was employed in the oxidation of ethane. With a feedstock containing 12.7 volume percent oxygen, 10.1 volume percent nitrogen (a contaminant in the ethane), and 74.4 volume percent ethane, together with minor amounts of ethylene, propylene, and carbon dioxide, and with a reactor retention time of approximately 2.9 seconds, a temperature of approximately 508° C. was found to be required for attaining a satisfactory oxidation rate as measured by a reduction of oxygen content of the product gases to about 5.9 volume percent. Of the oxygen fed to the reactor, about 10 percent was converted to hydrogen peroxide. Of the ethane fed to the reactor about 8 percent was reacted and of this about 79 percent was converted to ethylene.

Example IV

A mixture comprising 10 weight percent hydrogen peroxide, 10 weight percent water, and 80 weight percent acetic acid was fed at the rate of about 132 milliliters per hour into a 70 milliliter capacity thermo siphon reboiler surmounted by a 15-tray distillation column 31 millimeters in diameter. The liquid in the reboiler contained about 2 weight percent sulfuric acid and about 1000 p.p.m. of a pyrophosphate stabilizer. The column was operated at 31 millimeters of mercury absolute and at a reflux ratio of 1:1. The top temperature was about 33° C. and the pot temperature about 44° C. Distillate was withdrawn from the head of the column at substantially the same rate at which the feed mixture was being fed into the reboiler. The distillate comprised about 21.7 percent peracetic acid, 15 percent water, and 63 percent acetic acid. The peroxygen contained in the distillate amounted to about 98 percent of that contained in the material fed into the column.

Example V

A product similar to that obtained as the bottoms stream from the fractionating column in Example II is concentrated by vacuum distillation to produce a fraction having the same approximate composition as the feedstock employed in Example IV. This fraction together with approximately 2 percent of p-toluene sulfonic acid is introduced into the middle portion of a fractionating tower having approximately 30 trays and operating at a reflux ratio of about 2:1. As distillate from the column there is recovered a peracetic acid-water-acetic acid mixture similar to that obtained as product in Example IV. Some excess acetic acid is withdrawn near the base of the tower as a vapor side stream, while from the base of the column a liquid containing the toluene sulfonic acid catalyst is recycled to the feed point of the column. Portions of this base recycle stream are drawn off either intermittently or continuously as desired to remove high boiling impurities from the system.

It is to be understood that the foregoing detailed description is given merely by way of illustration and that many variations may be made therein without departing from the spirit of our invention.

The embodiments of the invention in which an exclusive property or privilege is claimed are defined as follows:

1. A process for recovering hydrogen peroxide, a lower olefin, and formaldehyde produced by the vapor-phase oxidation of a lower aliphatic hydrocarbon with a gas comprising molecular oxygen to form a gaseous reaction product comprising hydrogen peroxide, formaldehyde, and a lower olefin derived from said lower aliphatic hydrocarbon; which process comprises continuously introducing said gaseous reaction product into a distillation column at a location intermediate between the top and the base thereof while applying heat to the base of said column to provide a vapor boilup therein and while continuously introducing an extractant liquid into said column at a location above that at which the gaseous reaction product is introduced, said extractant liquid comprising a substantially non-aqueous liquid which is a member of the group consisting of esters, ethers, carboxylic acids, and cyclic acetals which are substantially free of primary and secondary hydroxy moiety and substantially chemically inert toward hydrogen peroxide at a temperature of about 70° C. and in which, at 70° C., the solubility of hydrogen peroxide is at least about 5 percent by weight; controlling the flow of said extractant into the column at a rate which is at least sufficient to provide on the trays of the column and in the liquid in the base of the column enough of said extractant to keep all liquid hydrogen peroxide there present in solution in said extractant; supplying boilup heat to the base of said column in an amount sufficient to keep the liquid in the base of said column substantially free of formaldehyde; withdrawing from the base of said column a bottoms stream comprising a solution of hydrogen peroxide in said extractant substantially free of formaldehyde; withdrawing from the top of said column a lean gas comprising said lower olefin and formaldehyde; recovering said lower olefin and formaldehyde from said lean gas; and recovering hydrogen peroxide from said bottoms stream.

2. The process of claim 1 wherein the lower aliphatic hydrocarbon is propane and the lower olefin is propylene.

3. The process of claim 2 wherein the extractant comprises acetic acid.

4. The process of claim 3 wherein the base of the column is maintained at a temperature of about 50° C. to 100° C.

5. The process of claim 3 including the additional steps of bringing the recovered bottoms stream into contact with an acidic catalyst and reacting the hydrogen peroxide and the acetic acid contained in said bottoms stream in the presence of said catalyst to form peracetic acid.

6. A process for separating a gas comprising formaldehyde, a lower olefin, and hydrogen peroxide into a fraction comprising formaldehyde and said olefin and a fraction comprising hydrogen peroxide, which process comprises introducing said gas into a distillation column at a location intermediate between the top and the base thereof while applying heat to the base of said column to provide a vapor boilup therein and while continuously introducing an extractant liquid into said column at a location above that at which said gas is introduced, said extractant comprising a substantially non-aqueous liquid which is a member of the group consisting of esters, ethers, carboxylic acids, and cyclic acetals which are substantially free of primary and secondary hydroxy moiety and substantially chemically inert toward hydrogen peroxide at a temperature of about 70° C. and in which, at 70° C., the solubility of hydrogen peroxide is at least about 5 percent by weight; controlling the flow of said extractant liquid into the column at a rate which is at least sufficient to provide on the trays of the column and in the liquid in the base of the column enough of said liquid to keep all liquid hydrogen peroxide there present in solution in said liquid; supplying boilup heat to the base of said column in an amount sufficient to keep the liquid in the base of said column substantially free of formaldehyde; withdrawing from the base of said column a liquid fraction comprising hydrogen peroxide dissolved in said extractant; and withdrawing from the top of said column a gaseous fraction comprising formaldehyde and said olefin.

7. The process of claim 6 wherein the olefin is propylene.

8. The process of claim 7 wherein the extractant liquid comprises acetic acid.

9. The process of claim 8 wherein the base of the column is maintained at a temperature of about 50° C. to 100° C.

References Cited

UNITED STATES PATENTS

| | | | |
|---|---|---|---|
| 2,452,414 | 10/1948 | Wong | 203—63 |
| 2,678,905 | 5/1954 | Dice | 203—60 |
| 2,802,025 | 8/1957 | Weitbrecht et al. | 260—502 |
| 2,949,343 | 8/1960 | Hood et al. | 23—207 |
| 3,074,782 | 1/1963 | Meeker et al. | 23—207 |
| 3,118,733 | 1/1964 | Sampson | 23—207 |

WILBUR L. BASCOMB, JR., *Primary Examiner.*